Jan. 9, 1940.  W. P. GEE  2,186,289
ROTARY DRUM FILTER
Filed June 4, 1937

WILLIAM PROVINE GEE
INVENTOR

BY R. J. Newbern
ATTORNEY

Patented Jan. 9, 1940

2,186,289

UNITED STATES PATENT OFFICE 2,186,289

ROTARY DRUM FILTER

William P. Gee, Plainfield, N. J., assignor to The Texas Company, New York, N. Y., a corporation of Delaware Application June 4, 1937, Serial No. 146,358

14 Claims. (Cl. 210—199)

This invention relates to a rotary drum filter, and particularly a filter of this character adapted for the continuous dewaxing of mineral oil.

One of the principal objects of the invention is to provide a rotary drum filter with means for readily and easily adjusting the extent and degree of vacuum or pressure differential of the cake forming and/or the cake washing and drying portions of the cycle.

Another object of the invention is to provide a filter of this character having provisions for blocking off all or any selected part of the cake forming and/or cake washing and drying portions of the cycle by a simple manipulation from the exterior of the filter without dismantling the same.

Still another object of the invention is to provide a filter of this character with means for adjusting the location, or the beginning and ending, of the cake forming and other portions of the cycle, and additional means independent of said adjusting means for readily varying the extent and the degree of vacuum or pressure differential of any portion of the cycle.

Other objects and advantages of the invention will be apparent from the following description, the appended claims, and the accompanying drawing.

In the drawing, which illustrates preferred embodiments of the present invention, Fig. 1 is a front elevation of a rotary drum filter of the present invention;

Figure 3:
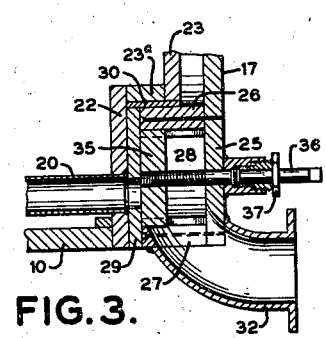
Fig. 3 is a vertical sectional view taken on the plane of the line 3—3 of Fig. 2 illustrating the construction of the valve and face plates and showing an adjustable plug with operating shaft therefor.

Referring to the drawing, the filter comprises a journal 10 mounted in bearings 11, the journal passing through a sleeve and stuffing box 12 at each end of a vat or tank 13 provided with an enclosing cover or hood 14. Mounted within the vat 13 and carried by the journal 10 to rotate therewith is the filter drum 15, which may be of entirely conventional construction as is commercially used in rotary drum filters of this type. The filter drum is partially submerged within the slurry to be filtered which is confined within the tank or vat 13, the periphery of the drum 15 forming the filter surface. This periphery is built up of a number of segments running longitudinally of the drum, these segments being separated by suitable spacers or partitions so as to provide a large number of separate filter chambers or zones about the periphery of the filter. Each of these separate chambers is connected by a pipe extending from the chamber down into the hollow journal 10 and then running longitudinally through the journal to a valve plate 16, and against which abuts a stationary face plate 17. One of these pipes is indicated in Fig. 3 at 20, the pipe connecting with and being fastened within an opening 21 in the valve plate 16 fastened to and rotating with the journal 10. In the particular filter illustrated, there are 30 segments or longitudinal filter chambers formed about the periphery of the drum, and consequently 30 pipes extending through the hollow journal 10 and connecting with appropriate pipe openings 21 in the valve plate 16.

Figure 1:
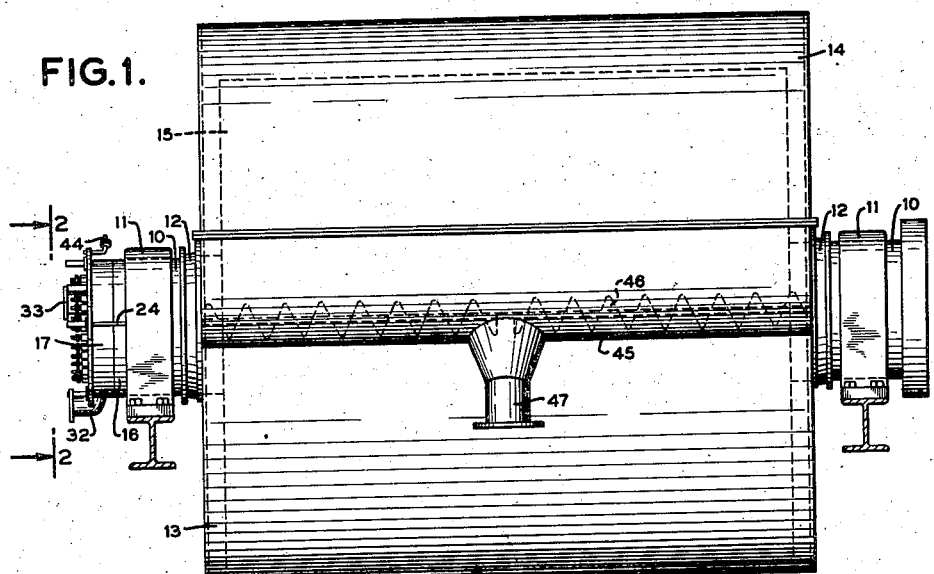

As shown, the valve plate is constructed of an outer annular plate 22, an inner circular offset plate 23 and a connecting ring 23a. The face plate 17 is held tightly against the valve plate by means of suitable tie rods and springs 24 (Figs. 1 and 2) which fasten in lugs in bearing 11. The face plate is made up of a circular piece 25 carrying inwardly projecting flanges 26 and 27 forming an annular chamber 28 between the valve plate and face plate. The ends of flanges 26 and 27 abut against a suitable wear plate 29 fastened to piece 22 of the valve plate 16 and formed with openings aligning with the pipe openings 21. The valve plate 16 also carries a sleeve bearing 30 arranged to receive the sliding contact of flange 26 of the face plate 17. The wear plate 29 and the sleeve bearing 30 thus receive the sliding engagement between the rotary valve plate and the stationary face plate. The valve plate is provided with a lower suction connection or filtrate discharge 32 communicating with annular chamber 28, and an upper suction connection or wash filtrate discharge 33 also communicating with the annular chamber 28.

Figure 2:
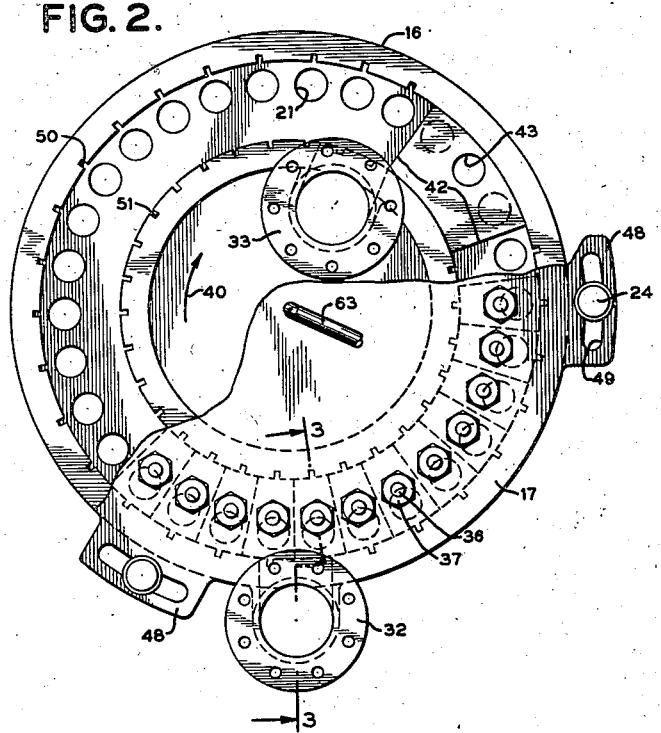
Fig. 2 is an end elevation of the face plate at the left-hand end of the journal of Fig. 1, looking in the direction of the arrows 2—2 of Fig. 1, with the upper portion of the face plate broken away to show in elevation the valve plate immediately behind this face plate.

In accordance with the present invention, the face plate 17 carries a plurality of adjustable plugs 35, each mounted on the threaded end of an adjustable valve stem 36 passing through a stuffing box 37 in the face of plate 25. By turning valve stem 36, the plug or valve 35 shown in Fig. 3 as abutting against the wear plate 29 and consequently closing port 21 of one of the pipes 20, will be moved to the right along threads of the valve stem, and thereby open communication between pipe 20 and chamber 28 including suction outlet 32. Valve stem 36 is threaded so that the plug 35 can be moved to the right in Fig. 3 until it abuts against the inner face of plate 25. Each plug 35 is trapezoidal in shape in front elevation as indicated in Fig. 2, the sides of the plug coinciding with radii passing through the central axis of the filter chamber 10. Each plug is guided for sliding movement by tongue and groove engagement with flanges 26 and 27. As shown, flange 26 is provided with grooves 50, and flange 27 with grooves 51, the plugs carrying tongues at opposite ends thereof which ride within said grooves. Each plug is machined to slidably engage adjacent plugs on opposite sides thereof as indicated in Fig. 2, or a slight clearance may be provided therebetween. Each plug 35 is also constructed of a thickness (as shown in Fig. 3) less than half the width of the chamber 28, considered as extending from the inner wall of plate 25 to the opposite wall of wear plate 29. This means that when one plug 35 is completely closed by abutting against wear plate 29 and shutting off the corresponding opening 21 of the respective pipe 20, while adjacent plugs on opposite sides thereof are completely open (i. e., abutting against the inner face of plate 25), a communicating space will be provided in the annular chamber 28 around the closed plug 35. This enables any portion of the plugs 35 to be closed, and yet those plugs which are open still afford communication of their respective pipes 20 with the discharge suction outlets 32 or 33.

As shown, an adjustable plug 35 is provided for each pipe 20, except for a permanently positioned plug 42 mounted between flanges 26 and 27 and covering an extent equivalent to three pipe openings 21, thereby controlling three segments of the filter. This permanently positioned plug 42 is provided with a circular bore or hole 43 extending through and adapted to register with each pipe opening 21 as it rotates past this bore 43. Connected to the outer end of this bore 43 is a pressure blow-back connection 44 (Fig. 1) adapted to supply a blow-back gas to discharge the filter cake from the filter surface of the drum 15 into a suitable trough 45, in which operates a feeding screw 46 which continuously discharges the cake through discharge spout 47. Face plate 17 is also provided with lugs 48 having elongated arcuate slots 49 receiving the tie rods 24, so that the plate can be rotated through a slight angle when the tie rods 24 are loosened, thereby permitting adjustment of the location, that is, the beginning and ending, of the cake forming, cake washing and drying, and discharge zones of the filter.

In the operation of the filter on dewaxing of mineral oil, tank 13 is partially filled with chilled wax slurry to be filtered until the rotary drum 15 is substantially half submerged. Suction is provided on connections 32 and 33 leading respectively to oil filtrate and wash filtrate receiving tanks, or the interior of the filter casing with enclosing hood 14 may be filled with a gas under pressure, so as to give either continuous vacuum or continuous pressure filter operation. The submerged portion of the filter constitutes the pickup or cake forming portion of the cycle. Assuming all the plugs 35 of this cake forming portion of the cycle to be open, then a high degree of suction will be produced in the pipes 20 as they rotate past this portion, such vacuum being communicated to the filter chambers. This will cause oil filtrate to pass through the periphery of drum 15 into the filter chambers and thence through pipes 20 to discharge outlet 32, while a wax cake will be built up on the filter surface.

As the filter with wax cake continues to rotate in the direction of the arrow 40 in Fig. 2, the filter surface with wax cake thereon will emerge from the wax slurry. The wax cake is then washed with chilled wash solvent by suitable means (not shown) and further dried by drawing gas from the gaseous atmosphere within the closed hood of the filter casing through the cake by suction applied through outlet 33. If a different suction is desired in the cake washing and drying zone from that applied in the pickup or cake forming zone, then one or more of the plugs 35 positioned approximately at the zone where the filter emerges from the wax slurry are closed, other adjacent plugs being left partially open so as to effectively close communication between that lower part of annular chamber 28 which is within the cake forming zone and that upper part of chamber 28 which is within the cake washing and drying zone. As the filter continues to rotate past the cake drying zone, it then comes opposite the permanently positioned plug 42, where the cake is discharged by blowback gas, assisted if desired by a suitable deflector blade or scraper (not shown). The permanently positioned plug closes communication between the right-hand portion of the annular chamber 28 within the cake washing and drying zone and the adjacent end of the chamber 28 within the cake forming zone where the pickup starts. As the filter continues to rotate past the permanently positioned plug 42, the ports 21 of pipes 20 again come opposite open plugs within the cake forming zone, and the cycle is repeated.

In the conventional rotary drum filter, the stationary face plate is generally provided with three separate annular zones or chambers opposite the pipe openings of the rotary valve plate. One of these annular chambers arranged at the bottom controls the pickup portion of the cycle, the second annular chamber controls the cake washing and drying portion of the cycle, and the third annular chamber controls the blow-back or cake discharge portion of the cycle. This arrangement makes no provision for altering or varying the extent of the suction or pressure differential which can be applied in the pickup zone or in the cake washing and drying zone. Adjustment of the face plate through the medium of lugs 48 and tie rods 24 merely alters the location of the various zones slightly, but does not afford any control of the extent or duration of the active portion of those zones.

Application of the continuous drum filter to mineral oil dewaxing has involved apparently unique problems, due to the fact that different oil stocks require entirely different filtration cycles. It has been found desirable to build up a wax cake of sufficient thickness for effective removal from the filter, which thickness should not ordinarily be greater than one-quarter inch so as to maintain desirable filtration rates. Certain oil stocks have free filtering characteristics and build up a wax cake of the desired thickness rapidly. These stocks require a low vacuum during the pickup period, or a small extent of pickup cycle. Other stocks have slow filtering characteristics and require maximum suction with maximum pickup period. Some regulation can be attained by adjustment of the speed of rotation of the filter drum. However, this does not solve the problem, because certain stocks, having free filtering characteristics and which build up the desired thickness of wax cake with a short extent of pickup time, nevertheless need a comparatively long time to thoroughly wash and require maximum vacuum and full washing time during the washing and drying portions of the cycle. Consequently, speeding up the rate of rotation of the filter may adjust the pickup portion of the cycle only at the sacrifice of necessary washing time. In addition, wax cakes from certain oil stocks tend to crack easily, and this requires a low degree of vacuum opposite the location where cracking tends to occur, which vacuum is just sufficient to retain the cake on the filter surface.

Attempts have been made to overcome these problems by dismantling the filter face plate and inserting plugs in the annular groove or chambers so as to block off a portion of the cake forming time or a portion of the cake washing and drying time. For example, it has been found necessary in some instances to block off as much as 80% of the cake forming section, while still retaining full vacuum and full extent of the cake washing and drying time. Attempts have also been made to overcome cake cracking by similarly dismantling the filter face plate and inserting blocks in the corresponding annular chambers, which blocks are provided with a score or a small groove on the face of the block so that only a low degree of vacuum will be communicated through the score or groove to the filter chamber at the location of incipient cracking. Each time a different oil stock is dewaxed on the filter which requires a different filtration cycle, the filter valve must be thus dismantled and the blocking changed to meet the new conditions. After the valve is reassembled, it can not be definitely determined, until the filter is in operation, whether the blocks have been inserted in the proper positions to meet the new conditions. The dismantling of the filter valve of the large rotary drum filters now employed in commercial dewaxing is an arduous and time consuming task, generally requiring that the filter must be down and out of production for a day or more, with a consequent very serious loss in production, not to mention the time and labor required in making the change.

The present invention effectively overcomes these difficulties and enables all or any part of the cake forming or cake washing and drying portions of the cycle, or both portions, to be rapidly and easily blocked off or opened without dismantling of the filter valve and without stopping production. The adjustment of each individual block or plug is readily made by simple manipulation of a wrench applied to the end of valve stem 36 which protrudes to the exterior of the face plate at an easily accessible location. A suitable indicator (not shown) may be provided for each valve stem of the form shown in Fig. 3, which indicator is responsive to rotation of valve stem 36, so as to indicate to the operator the exact position of the corresponding plug 35. In the form shown in Fig. 3, the valve stem is journaled within the plate 25 and is of the non-rising type. Not only may the extent or active portion of the cake forming and cake washing and drying zones be regulated, but the degree of vacuum or pressure differential at any particular location thereof may be adjusted. Thus one or more of the plugs 35 may be opened only slightly, so as to throttle the communication of suction to the corresponding filter chamber or chambers. Likewise, the cracking of wax cakes can be easily controlled by merely "cracking" a valve, or just barely opening a plug so as to give the low degree of suction which is sufficient to hold the cake on the filter surface but which is insufficient to cause the undesirable cracking action of the cake.

Figure 4:
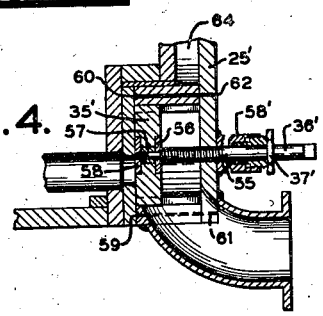
Fig. 4 is a vertical sectional view similar to Fig. 3, showing a modified form of adjustable plug and operating shaft therefor.

In the modification of Fig. 4, there is illustrated a valve stem 36' of the rising type. In this form, the valve stem is threaded through a threaded opening 55 in the face plate 25'. The inner end of valve stem 36' is provided with an extension of smaller diameter carrying a collar 56 abutting against the shoulder of the larger diameter portion. A sleeve 57 and a threaded collar 58 mounted on the outer threaded end of the smaller diameter portion of the stem complete the assembly. Collars 56 and 58 are mounted within circular grooves in opposite faces of plug 35', so that these collars do not protrude beyond the faces of the plug, and the plug can be closed tightly against the wear plate 29' at one end or opened completely against the face plate 25' at the other end. Plug 35' is loosely mounted on collars and sleeve so that as shaft 36' is rotated and moved outwardly to the right as shown in Fig. 4, the plug 35 does not rotate but merely slides along to the right, being guided by the tongue and grooves as previously described. Face plate 25' is provided with an elongated barrel 58' which loosely receives the threaded portion of stem 36 as it moves to the right through its extreme range of movement, and the outer end of barrel 58' beyond the travel of the threaded portion of stem 36' is equipped with a suitable stuffing box 37' for sealing the shaft.

In order to make a gas-tight seal between the valve plate 16 and the face plate 17, oil grooves 59 and 60 (see Fig. 4) are provided in the ends of flanges 27' and 26' respectively, to which oil under pressure is supplied by connections 61 and 62 respectively. To further hold the face plate snugly against the valve plate, a suction connection 63 is provided at the center of the face plate, which forms a partial vacuum in the space 64 between the face plate and the valve plate.

Obviously many variations and modifications of the invention as hereinbefore set forth may be made without departing from the spirit and scope thereof, and therefore only such limitations should be imposed as are indicated in the appended claims.

I claim:

1. A continuous rotary drum filter of the character described, comprising in combination, a drum having a peripheral filtering surface and a plurality of separate longitudinally extending filter chambers formed within the periphery thereof beneath the filtering surface, a hollow journal rotatably supporting said drum, a rotary valve plate carried by said journal adjacent one end thereof, a plurality of pipes extending from said filter chambers through said hollow journal to said valve plate, there being a pipe and an opening therefor through said valve plate for each of said filter chambers, a stationary face plate abutting against said valve plate and forming an annular passage provided with fluid connections adapted to communicate with said openings in the valve plate to provide zones of cake forming, cake washing and drying, and cake discharge for said filter, and adjustable means for blocking off the valve plate openings from communication with said annular passage in any selected portion or portions of said cake-forming zone while leaving remaining portions of said annular passage within said cake-forming zone free to communicate with said valve plate openings and without blocking communication of any portion of said annular passage with said fluid connections, said adjustable means being operable from the exterior of said filter without dismantling the same.

2. A continuous rotary drum filter of the character described, comprising in combination, a drum having a peripheral filtering surface and a plurality of separate longitudinally extending filter chambers formed within the periphery thereof beneath the filtering surface, a hollow journal rotatably supporting said drum, a rotary valve plate carried by said journal adjacent one end thereof, a plurality of pipes extending from said filter chambers through said hollow journal to said valve plate, there being a pipe and an opening therefor through said valve plate for each of said filter chambers, a stationary face plate abutting against said valve plate and forming an annular passage provided with fluid connections adapted to communicate with said openings in the valve plate to provide zones of cake forming, cake washing and drying, and cake discharge for said filter, and adjustable means for blocking off the valve plate openings from communication with said annular passage in any selected portion or portions of said cake-washing and drying zone while leaving remaining portions of said annular passage within said cake-washing and drying zone free to communicate with said valve plate openings and without blocking communication of any portion of said annular passage with said fluid connections, said adjustable means being operable from the exterior of said filter without dismantling the same.

3. A continuous rotary drum filter of the character described, comprising in combination, a drum having a peripheral filtering surface and a plurality of separate longitudinally extending filter chambers formed within the periphery thereof beneath the filtering surface, a hollow journal rotatably supporting said drum, a rotary valve plate carried by said journal adjacent one end thereof, a plurality of pipes extending from said filter chambers through said hollow journal to said valve plate, there being a pipe and an opening therefor through said valve plate for each of said filter chambers, a stationary face plate abutting against said valve plate and forming an annular passage provided with fluid connections adapted to communicate with said openings in the valve plate to provide zones of cake forming, cake washing and drying, and cake discharge for said filter, and adjustable means for blocking off the valve plate openings from communication with said annular passage in any selected portion or portions of said cake-forming zone and said cake-washing and drying zone while leaving remaining portions of said annular passage within the said zones free to communicate with said valve plate openings and without blocking communication of any portion of said annular passage with said fluid connections, said adjustable means being operable from the exterior of said filter without dismantling the same.

4. Apparatus according to claim 1, in which said adjustable means comprises an annular series of positioned plugs, each plug being individually movable between said valve plate and said face plate from a closed position adapted to block the pipe openings in the said valve plate as they move opposite said plug to an open position permitting communication between said pipe openings and said annular passage, and an individual operating shaft for each of said plugs extending through a stuffing box to the exterior of said face plate.

5. In a continuous rotary filter of the type described having a rotary drum with a peripheral filtering surface and a plurality of segmental longitudinal filtering chambers beneath the filtering surface, together with individual pipe connections from said filter chambers to a rotary valve plate carried by the journal of the filter drum, said valve plate having a circumferential series of ports communicating with said pipes; a stationary face plate abutting against said valve plate and forming a fluid chamber between said plates opposite said circumferential series of ports, fluid connections for said face plate adapted to provide zones of cake forming, cake washing and drying, and cake discharge for said filter, a circumferential series of plugs movably mounted within said fluid chamber between said plates, and individual means extending to and operable from the exterior of said plates for adjusting each of said plugs from a closed position adapted to block said circumferential series of ports as they move opposite each said plug to an open position permitting communication between said circumferential series of ports and said fluid chamber, each plug being constructed and arranged to move to a position blocking off an opposed opening in said valve plate while still affording open communication within said fluid chamber from opposite sides of said plug to said fluid connections.

6. Apparatus according to claim 5, in which the plugs are mounted to move in a direction parallel to the longitudinal axis of the filter, and the individual operating means for each plug comprises a shaft extending longitudinally through a stuffing box to the exterior of said face plate.

7. Apparatus according to claim 5, in which the plugs are mounted to move across the width of said fluid chamber and in which each plug has a thickness less than half the width of the said fluid chamber, whereby when one plug is fully closed and adjacent plugs on opposite sides thereof are fully opened, a fluid passage is provided within the fluid chamber around the said closed plug.

8. In a continuous rotary filter of the type described having a rotary drum with a peripheral filtering surface and a plurality of segmental longitudinal filtering chambers beneath the filtering surface, together with individual pipe connections from said filter chambers to a rotary valve plate carried by the journal of the filter drum, said valve plate having a circumferential series of ports communicating with said pipes; a stationary face plate having inwardly extending spaced flanges abutting against said valve plate and forming an annular fluid chamber therebetween, fluid connections for said face plate communicating with said annular chamber to provide zones of cake forming, cake washing and drying, and cake discharge for said filter, a circumferential series of plugs movably mounted within said annular chamber between said spaced flanges, individual means extending to and operable from the exterior of said plates for adjusting each of said plugs from a closed position blocking said circumferential series of ports to an open position providing communication between said circumferential series of ports and said annular chamber, and cooperating guiding grooves and tongues between said flanges and said plugs for guiding the said plugs in an adjusting movement.

9. In a continuous rotary filter of the type described having a rotary drum with a peripheral filtering surface and a plurality of segmental longitudinal filtering chambers beneath the filtering surface, together with individual pipe connections from said filter chambers to a rotary valve plate carried by the journal of the filter drum, said valve plate having a circumferential series of ports communicating with said pipes; a stationary face plate abutting against said valve plate and forming an annular fluid chamber between said plates opposite said circumferential series of ports, a nonadjustable plug mounted within said annular chamber having a circumferential extent of at least three valve plate ports and provided with a centrally located blow-back connection for cake discharge, fluid connections communicating with said annular chamber providing zones of cake forming and cake washing and drying, and a circumferential series of individually adjustable plugs mounted within said annular chamber within the cake forming and cake washing and cake drying zones in closely spaced relationship to each other, there being a separate plug for each valve plate port within said zones at any position within the cycle of rotation of said valve plate, each adjustable block being movable from a closed position adapted to block said valve plate ports as they rotate opposite said block to an open position permitting communication between said valve plate ports and said annular chamber.

10. In a continuous rotary filter of the type described having a rotary drum with a peripheral filtering surface and a plurality of segmental longitudinal filtering chambers beneath the filtering surface, together with individual pipe connections from said filter chambers to a rotary valve plate carried by the journal of the filter drum, said valve plate having a circumferential series of ports communicating with said pipes; a stationary face plate abutting against said valve plate with spaced flanges between said plates forming an annular fluid chamber therebetween and also a central fluid chamber therebetween which is closed from communication with said annular fluid chamber, fluid connections communicating with said annular chamber providing zones of cake forming, cake washing and drying, and cake discharge for said filter, a circumferential series of plugs moveably mounted within said annular fluid chamber for adjustment from a closed position blocking said circumferential series of ports to an opened position providing communication between said circumferential series of ports and said annular fluid chamber, and a suction connection to said central fluid chamber for producing a partial vacuum therein between said valve plate and said face plate.

11. Apparatus according to claim 10, in which abutting portions of said valve plate and face plate are provided with liquid sealing grooves, and connections for supplying sealing liquid to said grooves.

12. A continuous rotary drum filter of the character described, comprising in combination, a drum having a peripheral filtering surface and a plurality of separate longitudinally extending filter chambers formed within the periphery thereof beneath the filtering surface, a hollow journal rotatably supporting said drum, a rotary valve plate carried by said journal adjacent one end thereof, a plurality of pipes extending from said filter chambers through said hollow journal to said valve plate, there being a pipe and an opening therefor through said valve plate for each of said filter chambers, a stationary face plate abutting against said valve plate and having fluid connections adapted to communicate with said openings in the valve plate to provide zones of cake forming, cake washing and drying, and cake discharge for said filter, means for rotatably adjusting said base plate relative to said valve plate to thereby adjust the location of said cake forming portion of the filter cycle, and means independent of said adjusting means for blocking off said valve plate openings from communication with said fluid connections within all or any selected portion or portions of said cake-forming zone during the rotation of said valve plate, said blocking off means being operable from the exterior of said filter without dismantling the same.

13. A continuous rotary filter of the character described, comprising in combination, a rotary filter element having a filtering surface and a series of filter chambers formed within the interior of said element beneath the said filtering surface, valve means rotatable with said filter element having a series of ports communicating with said series of filter chambers, a stationary face plate cooperating with said rotatable valve means forming a fluid chamber and having fluid connections adapted to communicate through said fluid chamber with said valve ports to provide zones of cake forming, cake drying and cake discharge for said filter element during rotation thereof, and adjustable means mounted within said fluid chamber between said valve means and said face plate and operable from the exterior of the filter without dismantling the same for blocking off said valve ports within any selected portion or portions of the cake forming zone from communication with said fluid chamber while leaving the remaining portions of said fluid chamber within the cake forming zone free to communicate with said valve ports and without blocking communication of any portion of said fluid chamber with said fluid connections.

14. A continuous rotary drum filter of the character described, comprising in combination, a rotary drum having a peripheral filtering surface and a plurality of separate longitudinally extending filter chambers formed within the drum beneath the said filtering surface, valve means rotatable with said drum and having a series of control ports communicating with said filter chambers, a stationary face plate cooperating with said rotatable valve means forming a fluid chamber and having fluid connections adapted to communicate through said fluid chamber with said valve ports to provide zones of cake forming, cake drying and cake discharge for said drum filter upon rotation thereof, and adjustable means mounted within said fluid chamber between said valve means and said face plate and operable from the exterior of the filter without dismantling the same for blocking off said valve ports within any selected portion or portions of the cake forming zone from communication with said fluid chamber while leaving the remaining portions of said fluid chamber within the cake forming zone free to communicate with said valve ports and without blocking communication of any portion of said fluid chamber with said fluid connections.

WILLIAM P. GEE.